US010336309B2

(12) United States Patent
Georgin et al.

(10) Patent No.: US 10,336,309 B2
(45) Date of Patent: Jul. 2, 2019

(54) HEALTH MONITORING FOR A LINE REPLACEABLE UNIT (LRU)

(71) Applicant: GOODRICH CORPORATION, Charlotte, NC (US)

(72) Inventors: Marc Georgin, Dayton, OH (US); Michael Kordik, Dayton, OH (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 147 days.

(21) Appl. No.: 15/694,563

(22) Filed: Sep. 1, 2017

(65) Prior Publication Data
US 2019/0071063 A1 Mar. 7, 2019

(51) Int. Cl.
B60T 17/22 (2006.01)
B60T 8/17 (2006.01)
B64F 5/60 (2017.01)
F16D 66/00 (2006.01)
B60T 8/171 (2006.01)
B64C 25/42 (2006.01)

(52) U.S. Cl.
CPC .......... *B60T 17/221* (2013.01); *B60T 8/171* (2013.01); *B60T 8/1703* (2013.01); *B60T 17/22* (2013.01); *B64F 5/60* (2017.01); *F16D 66/00* (2013.01); *B64C 25/42* (2013.01); *F16D 2066/001* (2013.01)

(58) Field of Classification Search
CPC ........ B60T 17/221; B60T 8/171; B60T 17/22; B60T 8/1703; F16D 66/00; F16D 2066/001; B64F 5/60; B64C 25/42
See application file for complete search history.

(56) References Cited

U.S. PATENT DOCUMENTS

| 7,184,866 B2 * | 2/2007 | Squires .................. A62C 27/00 701/29.3 |
| 7,540,572 B2 | 6/2009 | Nakamura |
| 2008/0074070 A1 | 3/2008 | Kumar et al. |

(Continued)

FOREIGN PATENT DOCUMENTS

| EP | 3096196 | 11/2016 |
| FR | 3012888 | 5/2015 |

OTHER PUBLICATIONS

European Patent Office, European Search Report dated Jan. 28, 2019 in Application No. 18191287.4.

*Primary Examiner* — Rodney A Butler
(74) *Attorney, Agent, or Firm* — Snell & Wilmer, L.L.P.

(57) ABSTRACT

A BCU for determining a health status of a LRU having a coil includes a non-transitory memory configured to store instructions and a controller coupled to the non-transitory memory. The controller is designed to receive a temperature from a temperature sensor, to receive a direct current (DC) voltage that is applied to the coil of the LRU, and to receive a detected current corresponding to an amount of current flowing through the coil. The controller is further designed to determine a calculated resistance of the coil based on the detected current and the DC voltage and to determine a compensated resistance of the coil based on the temperature and the calculated resistance of the coil. The controller is further designed to determine the health status of the LRU by comparing the compensated resistance of the coil to a nominal resistance of the coil.

20 Claims, 5 Drawing Sheets

(56) References Cited

U.S. PATENT DOCUMENTS

2014/0306814 A1 10/2014 Ricci
2015/0276877 A1 10/2015 Biswas et al.
2017/0137144 A1 5/2017 Georgin

* cited by examiner

HEALTH MONITORING FOR A LINE REPLACEABLE UNIT (LRU)

FIELD

The present disclosure relates to systems and methods for determining a health status of line replaceable units (LRUs) of aircraft brakes.

BACKGROUND

Aircraft may include multiple line replacement units (LRUs) that are replaceable parts of the aircraft. For example, aircraft brake systems may include a wheel speed sensor or a valve that are relatively easy to replace. The aircraft may further include systems to determine when a LRU has failed. In response to determining that a LRU has failed, a maintenance crew may be notified and the failed part may be replaced. In certain situations, a replacement part may be located at the same location as the aircraft. In such a situation, the aircraft may be grounded for one or more hours while the replacement part is installed. In other situations, the aircraft may be grounded for one or more full day if the replacement part is located at a remote location from the location of the aircraft.

SUMMARY

A brake control unit (BCU) in accordance with various embodiments for determining a health status of a line replaceable unit (LRU) having a coil includes a non-transitory memory configured to store instructions. The BCU further includes a controller coupled to the non-transitory memory. The controller is designed to receive a temperature from a temperature sensor. The controller is further designed to receive a direct current (DC) voltage that is applied to the coil of the LRU. The controller is further designed to receive a detected current corresponding to an amount of current flowing through the coil. The controller is further designed to determine a calculated resistance of the coil based on the detected current and the DC voltage. The controller is further designed to determine a compensated resistance of the coil based on the temperature and the calculated resistance of the coil. The controller is further designed to determine the health status of the LRU by comparing the compensated resistance of the coil to a nominal resistance of the coil.

In any of the foregoing embodiments, the temperature includes a brake temperature detected by a brake temperature sensor (BTS) and an ambient temperature detected by an auxiliary temperature sensor separated from the BTS, and the controller is further configured to determine the compensated resistance of the coil based on at least one of the brake temperature or the ambient temperature.

In any of the foregoing embodiments, the controller is further configured to determine that the brake temperature and the ambient temperature are similar in response to determining that a difference between the brake temperature and the ambient temperature is less than a threshold temperature difference, and determine the compensated resistance of the coil and the health status of the LRU in response to determining that the brake temperature and the ambient temperature are similar.

In any of the foregoing embodiments, the controller is further configured to determine the compensated resistance of the coil based on at least one of the brake temperature alone, the ambient temperature alone, or an average of the brake temperature and the ambient temperature.

In any of the foregoing embodiments, the controller is further configured to determine a resistance difference between the compensated resistance of the coil and the nominal resistance of the coil, and determine that the LRU is to be replaced within a predetermined amount of time in response to determining that the resistance difference is greater than a resistance threshold value.

In any of the foregoing embodiments, the nominal resistance of the coil corresponds to a specific resistance of the coil at a nominal temperature, and the compensated resistance of the coil corresponds to a predicted resistance of the coil at the nominal temperature.

In any of the foregoing embodiments, the controller is further configured to control an output device to output data corresponding to the health status of the LRU in response to determining the health status of the LRU.

In any of the foregoing embodiments, the LRU includes a wheel speed sensor having a rotating magnet such that the coil remains stationary relative to the rotating magnet and outputs an analog current (AC) waveform based on an angular speed of the rotating magnet.

In any of the foregoing embodiments, the LRU includes a valve having a poppet such that the coil actuates the poppet to close or open the valve in response to receiving the DC voltage.

Any of the foregoing embodiments may also include a BCU temperature sensor configured to detect a BCU temperature, and the controller is further configured to determine the health status of the LRU in response to determining that the BCU temperature is greater than a BCU temperature threshold.

A system in accordance with various embodiments for determining a health status of a line replaceable unit (LRU) having a coil includes a brake temperature sensor (BTS) configured to detect a brake temperature of a brake. The system further includes an auxiliary temperature sensor separate from the BTS and configured to detect an ambient temperature. The system further includes a power source configured to apply a direct current (DC) voltage to the coil of the LRU. The system further includes a brake control unit (BCU). The BCU is designed to receive the brake temperature and the ambient temperature, receive a detected current corresponding to an amount of current flowing through the coil, and determine a calculated resistance of the coil based on the detected current and the DC voltage. The BCU is further designed to determine a compensated resistance of the coil based on the calculated resistance of the coil and at least one of the brake temperature or the ambient temperature, and determine the health status of the LRU by comparing the compensated resistance of the coil to a nominal resistance of the coil.

In any of the foregoing embodiments, the BCU is further configured to determine that the brake temperature and the ambient temperature are similar in response to determining that a difference between the brake temperature and the ambient temperature is less than a threshold temperature difference, and determine the compensated resistance of the coil and the health status of the LRU in response to determining that the brake temperature and the ambient temperature are similar.

In any of the foregoing embodiments, the BCU is further configured to determine the compensated resistance of the coil based on at least one of the brake temperature alone, the ambient temperature alone, or an average of the brake temperature and the ambient temperature.

In any of the foregoing embodiments, the BCU is further configured to determine a resistance difference between the compensated resistance of the coil and the nominal resistance of the coil, and determine that the LRU is to be replaced within a predetermined amount of time in response to determining that the resistance difference is greater than a resistance threshold value.

In any of the foregoing embodiments, the LRU includes a wheel speed sensor having a rotating magnet such that the coil remains stationary relative to the rotating magnet and outputs an analog current (AC) waveform based on an angular speed of the rotating magnet, and the power source is a separate component from the wheel speed sensor.

In any of the foregoing embodiments, the LRU includes a valve having a poppet such that the coil actuates the poppet to close or open the valve in response to receiving the DC voltage.

In any of the foregoing embodiments, the BCU further includes a BCU temperature sensor configured to detect a BCU temperature, and the BCU is further configured to determine the health status of the LRU in response to determining that the BCU temperature is greater than a BCU temperature threshold.

A method in accordance with various embodiments for determining a health status of a line replaceable unit (LRU) having a coil includes receiving, at a BCU, a temperature. The method further includes receiving, at the BCU, a direct current (DC) voltage that is applied to the coil of the LRU. The method further includes receiving, at the BCU, a detected current corresponding to an amount of current flowing through the coil. The method further includes determining, by the BCU, a calculated resistance of the coil based on the detected current and the DC voltage. The method further includes determining, by the BCU, a compensated resistance of the coil based on the temperature and the calculated resistance of the coil. The method further includes determining, by the BCU, the health status of the LRU by comparing the compensated resistance of the coil to a nominal resistance of the coil.

Any of the foregoing embodiments may also include determining, by the BCU, a resistance difference between the compensated resistance of the coil and the nominal resistance of the coil; and determining, by the BCU, that the LRU is to be replaced within a predetermined amount of time in response to determining that the resistance difference is greater than a resistance threshold value.

Any of the foregoing embodiments may also include controlling, by the BCU, an output device to output data corresponding to the health status of the LRU in response to determining the health status of the LRU.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
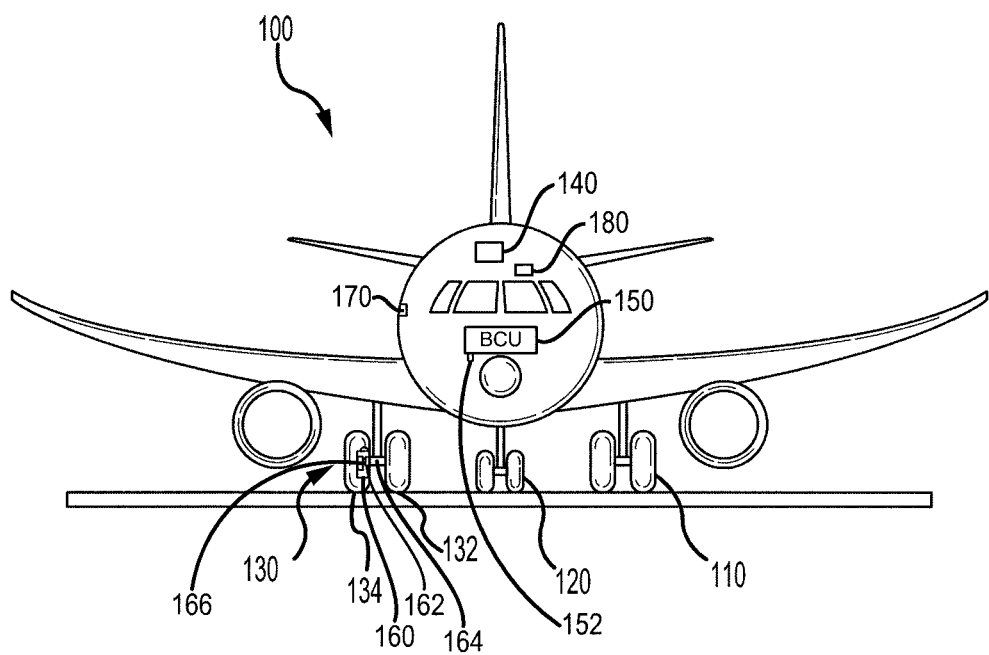
FIG. 1A illustrates an aircraft having multiple landing gear and brakes, in accordance with various embodiments.

Referring now to FIG. 1A, an aircraft 100 in accordance with various embodiments can include multiple landing gear including a first landing gear 110, a second landing gear 120, and a third landing gear 130. Each landing gear may include one or more wheel assemblies. For example, the third landing gear 130 includes an inner wheel assembly 132 and an outer wheel assembly 134.

The aircraft 100 may further include an avionics unit 140. The avionics unit 140 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. In various embodiments, the avionics unit 140 may control the flight of, and operation of various components of, the aircraft 100. The avionics unit may control various parameters of flight and may include, for example, a traffic avoidance system, an air traffic management system, an autothrust system, an autopilot system, a flight control system, hydraulics systems, pneumatics systems, environmental systems, electrical systems, engine systems, trim systems, lighting systems, crew alerting systems, electronic checklist systems, an electronic flight bag, and the like.

Figure 1B:
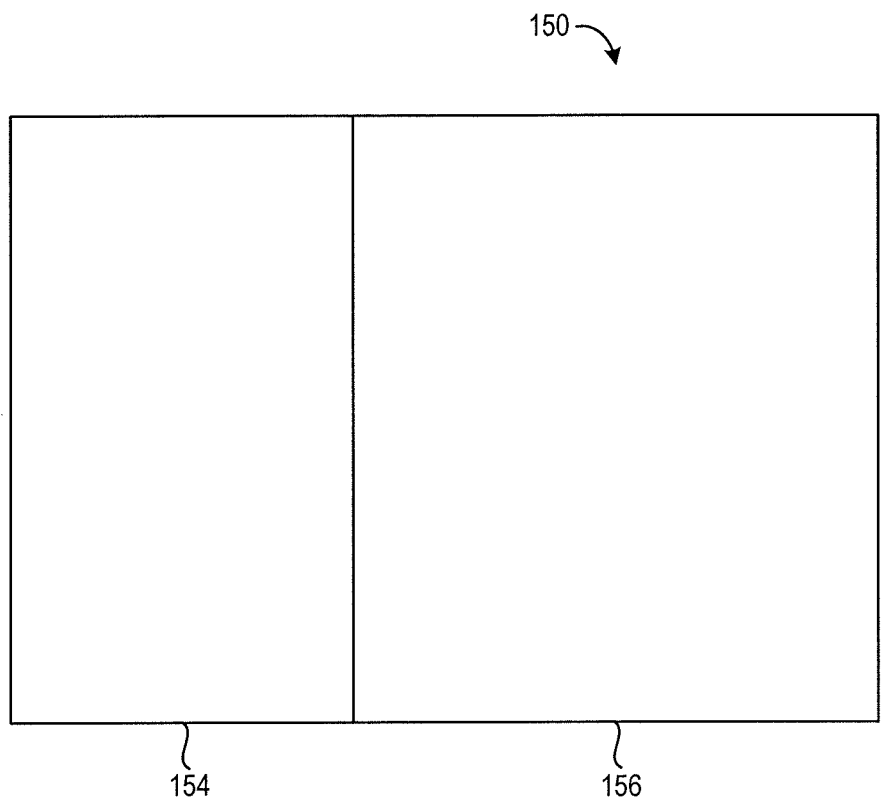
FIG. 1B illustrates a brake control unit (BCU) of the aircraft of FIG. 1A in accordance with various embodiments.

The aircraft 100 may further include a brake control unit (BCU) 150. With brief reference to FIGS. 1A and 1B, the BCU 150 may include one or more controller 156 and one or more tangible, non-transitory memory 154 and be capable of implementing logic. For example, the non-transitory memory 154 may store instructions that can be implemented by the controller 156 for performing various functions such as determining a health status of a line replaceable unit (LRU) of the aircraft 100. The controller 156 can be a general purpose processor, a digital signal processor (DSP), an application specific integrated circuit (ASIC), a field programmable gate array (FPGA) or other programmable logic device, discrete gate or transistor logic, discrete hardware components, or any combination thereof. In various embodiments, the BCU 150 may be specifically designed for controlling operation of aircraft brakes.

Returning reference to FIG. 1A, the aircraft 100 may further include one or more brake coupled to each wheel assembly. For example, a brake 160 may be coupled to the outer wheel assembly 134. The brake 160 may apply a braking force to the outer wheel assembly 134 upon receiving a brake command from the BCU 150.

The aircraft 100 may include additional components such as LRUs and various sensors. For example, a brake temperature sensor (BTS) 162 may be located near or on the brake 160. The BTS 162 may detect a brake temperature of the brake 160 or an area near the brake 160. Additionally, an auxiliary temperature sensor 170 may be located at any location on the aircraft 100 and be spaced apart from the BTS 162. The auxiliary temperature sensor 170 may detect an ambient temperature corresponding to its specific location on the aircraft 100. For example, the auxiliary temperature sensor 170 may be located on or in a fuselage of the aircraft 100, on or near a gas turbine engine of the aircraft 100, in a cockpit of the aircraft 100, or the like.

A BCU temperature sensor 152 may be located on or near the BCU 150. The BCU temperature sensor 152 may detect a BCU temperature corresponding to a temperature at or near the BCU 150. In some embodiments, the BCU temperature sensor 152 may be located inside of the BCU 150 and may be designed to measure a temperature of an electronic board of the BCU 150 to ensure that the components (including microprocessors) of the BCU 150 are operating within a proper temperature range.

The brake 160, or landing gear 130, may include a wheel speed sensor 164. The wheel speed sensor 164 may be designed to detect a wheel speed of the outer wheel assembly 134. The brake 160 may further include a valve 166, such as a hydraulic valve. The valve 166 may include a shut off valve, another valve, or the like. Each of the wheel speed sensor 164 and the valve 166 may be an LRU. An LRU may include any component of the aircraft 100 (or of the brake 160 or the landing gear 130) that is replaceable.

The BCU 150 may be capable of determining a health status of any LRU of the aircraft 100 that includes a coil. The coil may include any conductive coil such as an inductor, a solenoid, or the like.

The aircraft 100 may further include an output device 180. The output device 180 may include any output device capable of providing information to a pilot, a copilot, or a maintenance crew. For example, the output device may include a display, a speaker, a network access device that sends a message to a remote terminal, or the like. The BCU 150 may control the output device 180 to output the health status of one or more LRU.

Figure 2:
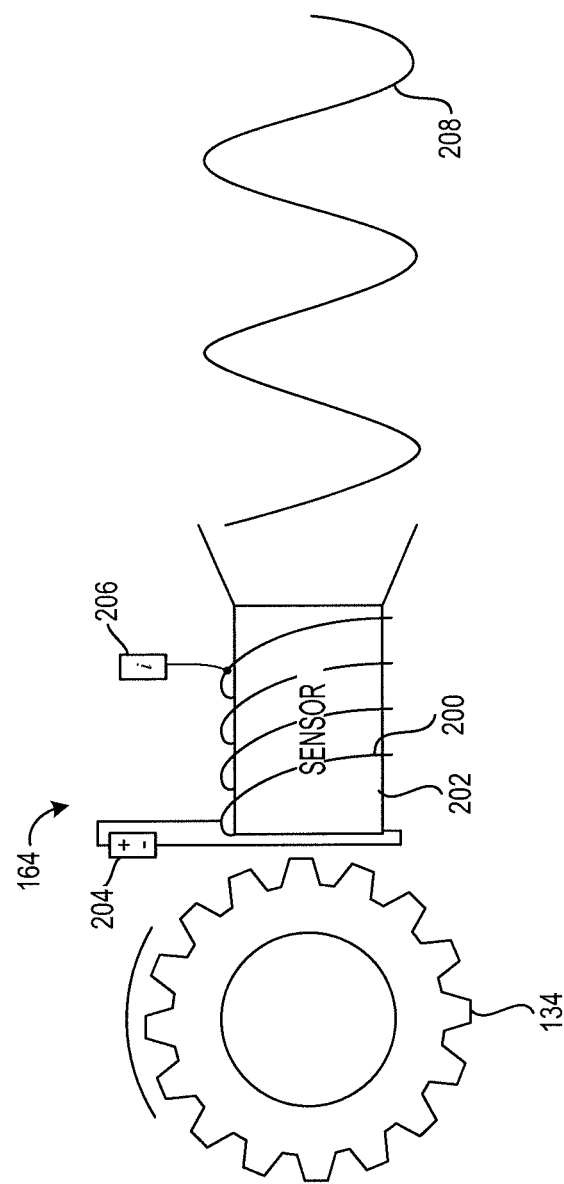
FIG. 2 illustrates a wheel speed sensor that is a LRU of the aircraft of FIG. 1A, in accordance with various embodiments.

Turning to FIG. 2, the wheel speed sensor 164 may include a coil 200 wrapped around a magnet 202. The magnet 202 may be positioned relatively close to the outer wheel assembly 134 and may be coupled to the outer wheel assembly 134. As the outer wheel assembly 134 rotates, the magnet 202 may rotate along with the outer wheel assembly 134. The coil 200 may be fastened or coupled to another object, such as an axle of the aircraft 100 of FIG. 1, and may be stationary (i.e., not rotate) relative to the axle. In that regard, the magnet 202 may rotate relative to the axle (and the coil 200). The rotation of the magnet 202 may generate an analog current (AC) waveform 208 within the coil 200. The AC waveform 208 may be received by a component (such as the BCU 150 of FIG. 1A) which may determine the angular velocity of the outer wheel assembly 134 based on the AC waveform 208.

The wheel speed sensor 164 may include a power source 204 the power source 204 be an integral component with the wheel speed sensor 164 or may be a separate component. The power source 204 may apply a direct current (DC) voltage across the coil 200. The coil 200 may operate as a resistor such that current may flow through the coil 200 based on the applied voltage. A current sensor 206 may be coupled to the coil 200 and may detect the current flowing through coil 200. The current sensor 206 may include a hardware-based current sensor or a software-based current sensor (such as logic implemented in the BCU 150).

Referring now to FIGS. 1A and 2, the BCU 150 may determine the health of the wheel speed sensor 164 based on the voltage applied to the coil 200 along with the current flowing through the coil 200. For example, the coil 200 may have a nominal resistance that corresponds to a specific resistance of the coil 200 at a nominal (i.e., specific) temperature. The nominal resistance may correspond to the resistance of the coil 200 in response to the coil 200 being brand-new, or to the resistance of the coil that is specified by the manufacturer.

As the wheel speed sensor 164 is used, the actual resistance of the coil 200 may increase or decrease away from the nominal resistance, indicating that the wheel speed sensor 164 (or the coil 200) is wearing. In that regard, the BCU 150 may determine a calculated resistance of the coil 200 based on the voltage applied to the coil 200 and the current flowing through the coil 200. The BCU 150 may then calculate a compensated resistance of the coil based on a detected temperature and the calculated resistance of the coil. The compensated resistance may correspond to a predicted resistance of the coil 200 at the specific (i.e., nominal) temperature. For example, the specific temperature may correspond to room temperature. The BCU 150 may then determine a health of the wheel speed sensor 164 by comparing the compensated resistance to the nominal resistance to determine how much the resistance of the coil 200 has changed over time.

Figure 3:
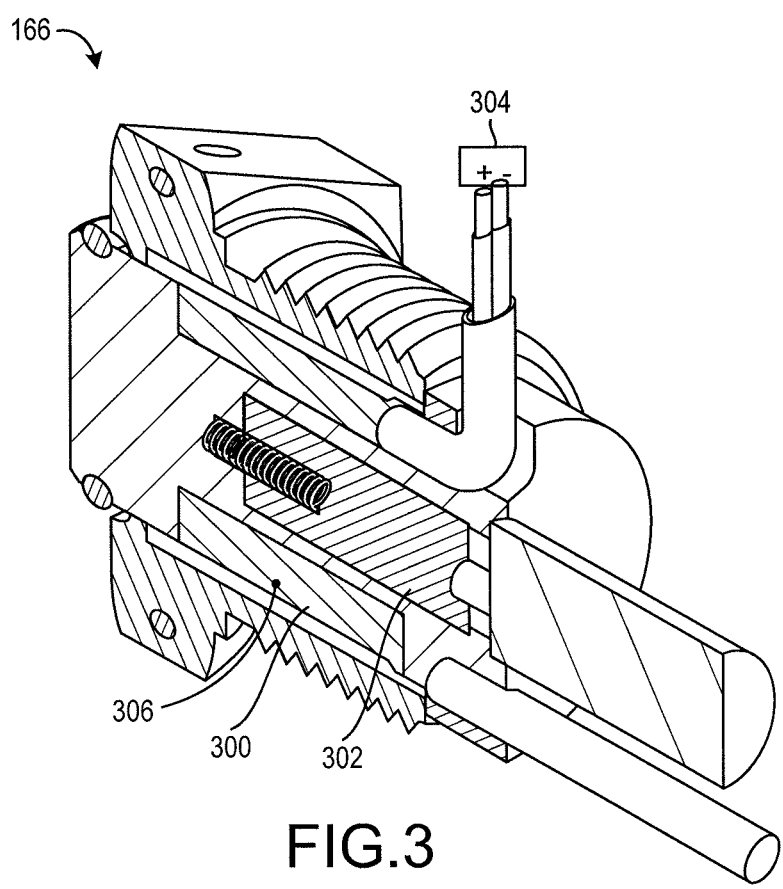
FIG. 3 illustrates a valve that is another LRU of the aircraft of FIG. 1A, in accordance with various embodiments.

Referring now to FIG. 3, a valve 166 may include a coil 300 electrically coupled to a power source 304. In various embodiments, the valve 166 may be a shutoff valve. The valve 166 may further include a poppet 302. The power source 304 may apply a DC voltage to the coil 300. In response to the DC voltage being applied to the coil 300, the magnetic field generated by the coil 300 may actuate the poppet 302 to close or open the valve 166.

The valve 166 may further include a current sensor 306. The current sensor 306 may detect an amount of current running through the coil 300. In that regard and referring to FIGS. 1A and 3, the BCU 150 may calculate a calculated resistance based on the voltage applied by the power source 304 and the current detected by the current sensor 306. The BCU 150 may then calculate a compensated resistance of the coil 300 based on a detected temperature and the calculated resistance of the coil 300. The compensated resistance may correspond to a predicted resistance of the coil 300 at the specific (i.e., nominal) temperature. For example, the specific temperature may correspond to room temperature. The BCU 150 may then determine a health of the valve 166 by comparing the compensated resistance to the nominal resistance to determine how much the resistance of the coil 300 has changed over time.

Figure 4:
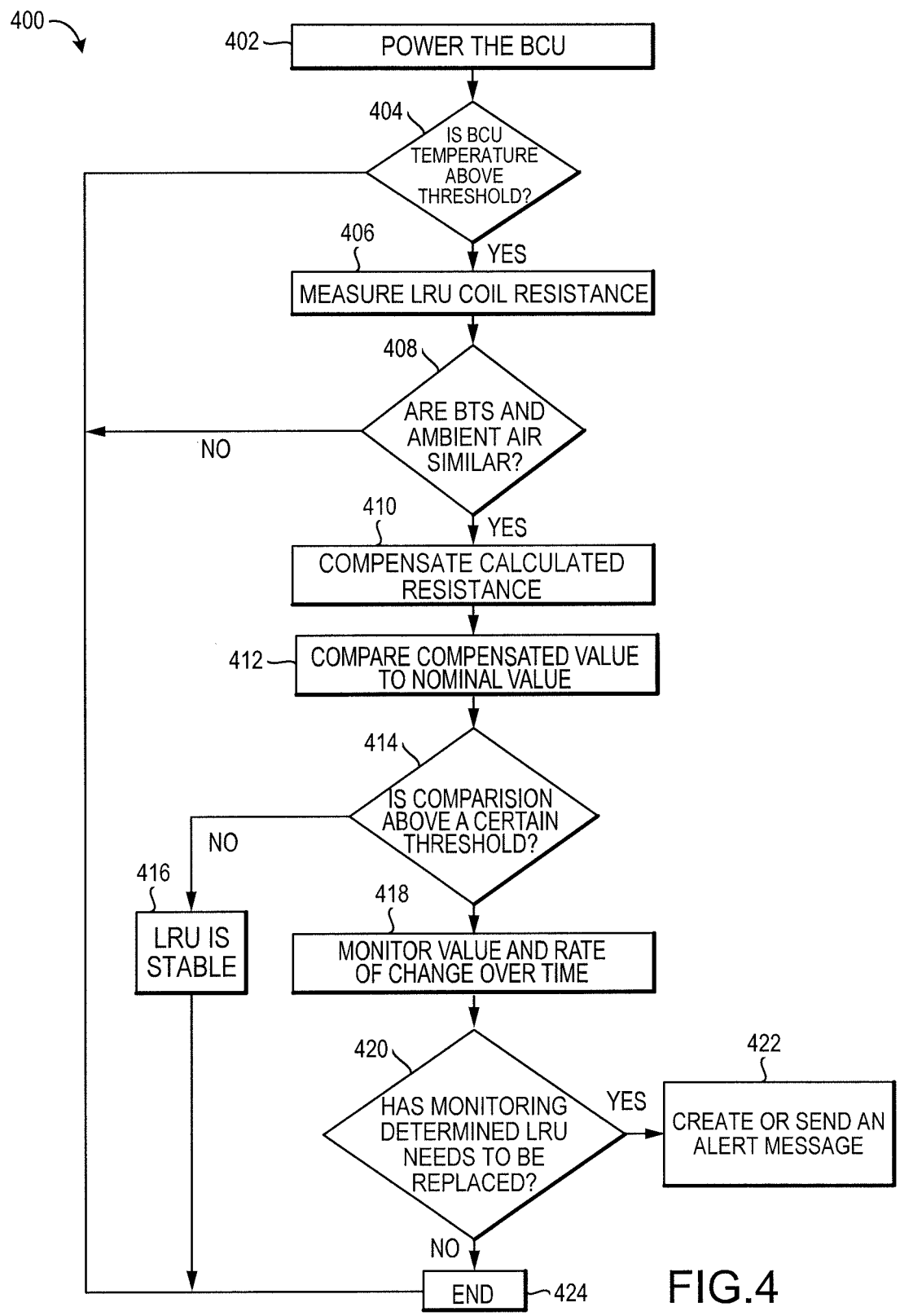
FIG. 4 is a flowchart illustrating a method for determining a health status of an LRU of an aircraft, in accordance with various embodiments.

Referring now to FIG. 4, a method 400 for determining a health of a LRU is shown. The method 400 may be performed by components of an aircraft such as the aircraft 100 of FIG. 1. In block 402, a BCU of the aircraft may be powered.

Before proceeding with the method 400, it may be desirable to determine whether the BCU has reached a warm-up temperature. If the BCU is below a warm-up temperature then false failures may be detected. In that regard, in block 404, the method 400 may include determining whether the BCU temperature has reached or exceeded a BCU temperature threshold. The BCU temperature threshold may correspond to a threshold temperature above which the BCU is considered sufficiently warmed up such that false failures are unlikely to be detected. For example, the BCU temperature threshold may be −40 degrees Celsius (−40 degrees C., −40 degrees Fahrenheit, F.).

In response to the BCU temperature reaching or exceeding the BCU temperature threshold, the method 400 may proceed to block 406. In block 406, the LRU coil resistance may be calculated by the BCU. For example, a DC voltage may be applied to the coil and a current running through the coil may be measured. Using the formula voltage (V)=current (I)*resistance (R), the calculated resistance may be determined based on the applied voltage and the measured current.

In block 408, the BCU may receive the brake temperature of a brake associated with a BTS, and may also receive an ambient temperature detected by an auxiliary temperature sensor. For example, the ambient temperature may be received from an avionics unit that is coupled to the auxiliary temperature sensor.

The BCU may then compare the brake temperature to the ambient temperature. The BCU may make this comparison to determine whether the brake temperature and the ambient temperature are similar. The BCU may determine that the brake temperature and the ambient temperature are similar in response to determining that a difference between the brake temperature and the ambient temperature is less than a threshold temperature difference. The threshold temperature difference may correspond to a temperature difference above which the brake temperature is sufficiently different than the ambient temperature such that calculations based on the brake temperature may provide inaccurate results. For example, the threshold temperature difference may be 5 degrees C. (9 degrees F.), 10 degrees C. (18 degrees F.), or the like. In various embodiments, the BCU may only determine that the brake temperature and the ambient temperature are similar in response to the difference being less than the threshold temperature difference for a predetermined period of time, such as 3 seconds.

In block 410, the BCU may compensate the calculated resistance of the coil based on a temperature. The temperature may include the brake temperature, the ambient temperature, or an average of the brake temperature and the ambient temperature.

The compensated temperature may correspond to a prediction of the current resistance of the coil at the specific (nominal) temperature at which the nominal resistance corresponds to. The BCU may determine the compensated resistance based on the calculated resistance and the temperature. For example, the BCU may determine a difference between the specific temperature of the nominal resistance and the measured temperature. Based on the material of the coil, the BCU may be aware of, or capable of determining, a change in resistance of the coil for each degree difference. For example, BCU may be configured for use with a copper coil and may be aware that the resistance of copper increases by 0.393 ohms as the temperature increases by 1 degree C. (1.8 degrees F.). If the calculated resistance is 200 ohms, the measured temperature is 0 degrees C. (32 degrees F.), and the specific temperature of the nominal resistance is 20 degrees C. (68 degrees F.), the BCU may multiply the 20 degree C. difference by 0.00393 ohms and by the calculated resistance (15.7 ohms), add this value to the calculated resistance (200 ohms) and determine that the compensated resistance is equal to 215.7 ohms.

In block 412, the BCU may compare the compensated resistance to the nominal resistance and determine a resistance difference corresponding to a difference between the compensated resistance and the nominal resistance.

In block 414, the BCU may determine whether the resistance difference is greater than a resistance threshold value. In various embodiments, the BCU may compare the resistance difference to multiple resistance threshold values. The BCU may determine or predict a health status (such as a remaining life of the coil (or the LRU)) based on the comparison of the resistance difference to the one or more resistance threshold.

For example and based on learned information, the BCU may determine that the coil (or the LRU) is likely to fail within 6 months if the resistance difference is greater than a first resistance threshold, is likely to fail within 3 months if the resistance difference is greater than a second resistance threshold, and is likely to fail within 10 days if the resistance difference is greater than a third resistance threshold.

In block 416, if the resistance difference is less than the resistance threshold (or the lowest resistance threshold (corresponding to the lowest difference in resistances) if multiple resistance thresholds are used) then the BCU may determine that the LRU is stable (i.e., unlikely to fail within a predetermined amount of time).

In block 418, if the resistance difference is greater than the resistance threshold (or the lowest resistance threshold) then the BCU may monitor the compensated resistance value along with the rate of change of the compensated resistance value over time. By monitoring the compensated resistance value and the rate of change, the BCU may determine patterns corresponding to the compensated resistance values. For example, the BCU may determine that the compensated resistance value increases or decreases at a faster rate in response to the resistance difference reaching or exceeding a predetermined difference value.

In block 420, the BCU may determine whether the LRU is to be replaced. For example, the BCU may determine that the LRU is to be replaced in response to determining that the LRU is likely to fail within a relatively short time threshold such as one day, 5 days, 10 days, or the like. The relatively short time threshold may correspond to an amount of time that is sufficiently long to ensure that a replacement LRU can be obtained and the LRU replaced prior to the LRU failing. The BCU may determine that the LRU is likely to fail within the relatively short time threshold in response to determining that the resistance difference is greater than or equal to a specific resistance threshold (such as the greatest resistance threshold).

In block 422, if the BCU determines that the LRU is to be replaced, the BCU may create or send an alert message indicating that the LRU is to be replaced. For example, the BCU may control an output device to alert aircraft personnel (such as a pilot, a copilot, or a maintenance crew) that the LRU is to be replaced. Otherwise, the method 400 may end in block 424.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake control unit (BCU) for determining a health status of a line replaceable unit (LRU) having a coil, comprising:
   a non-transitory memory configured to store instructions; and
   a controller coupled to the non-transitory memory and configured to:
   receive a temperature from a temperature sensor,
   receive a direct current (DC) voltage that is applied to the coil of the LRU,
   receive a detected current corresponding to an amount of current flowing through the coil,
   determine a calculated resistance of the coil based on the detected current and the DC voltage,
   determine a compensated resistance of the coil based on the temperature and the calculated resistance of the coil, and
   determine the health status of the LRU by comparing the compensated resistance of the coil to a nominal resistance of the coil.

2. The BCU of claim 1, wherein the temperature includes a brake temperature detected by a brake temperature sensor (BTS) and an ambient temperature detected by an auxiliary temperature sensor separated from the BTS, and the controller is further configured to determine the compensated resistance of the coil based on at least one of the brake temperature or the ambient temperature.

3. The BCU of claim 2, wherein the controller is further configured to:
   determine that the brake temperature and the ambient temperature are similar in response to determining that a difference between the brake temperature and the ambient temperature is less than a threshold temperature difference, and
   determine the compensated resistance of the coil and the health status of the LRU in response to determining that the brake temperature and the ambient temperature are similar.

4. The BCU of claim 2, wherein the controller is further configured to determine the compensated resistance of the coil based on at least one of the brake temperature alone, the ambient temperature alone, or an average of the brake temperature and the ambient temperature.

5. The BCU of claim 1, wherein the controller is further configured to:
   determine a resistance difference between the compensated resistance of the coil and the nominal resistance of the coil, and
   determine that the LRU is to be replaced within a predetermined amount of time in response to determining that the resistance difference is greater than a resistance threshold value.

6. The BCU of claim 1, wherein the nominal resistance of the coil corresponds to a specific resistance of the coil at a nominal temperature, and the compensated resistance of the coil corresponds to a predicted resistance of the coil at the nominal temperature.

7. The BCU of claim 1, wherein the controller is further configured to control an output device to output data corresponding to the health status of the LRU in response to determining the health status of the LRU.

8. The BCU of claim 1, wherein the LRU includes a wheel speed sensor having a rotating magnet such that the coil remains stationary relative to the rotating magnet and outputs an analog current (AC) waveform based on an angular speed of the rotating magnet.

9. The BCU of claim 1, wherein the LRU includes a valve having a poppet such that the coil actuates the poppet to close or open the valve in response to receiving the DC voltage.

10. The BCU of claim 1, further comprising a BCU temperature sensor configured to detect a BCU temperature, and the controller is further configured to determine the health status of the LRU in response to determining that the BCU temperature is greater than a BCU temperature threshold.

11. A system for determining a health status of a line replaceable unit (LRU) having a coil, comprising:
a brake temperature sensor (BTS) configured to detect a brake temperature of a brake;
an auxiliary temperature sensor separate from the BTS and configured to detect an ambient temperature;
a power source configured to apply a direct current (DC) voltage to the coil of the LRU; and
a brake control unit (BCU) configured to:
receive the brake temperature and the ambient temperature,
receive a detected current corresponding to an amount of current flowing through the coil,
determine a calculated resistance of the coil based on the detected current and the DC voltage,
determine a compensated resistance of the coil based on the calculated resistance of the coil and at least one of the brake temperature or the ambient temperature, and
determine the health status of the LRU by comparing the compensated resistance of the coil to a nominal resistance of the coil.

12. The system of claim 11, wherein the BCU is further configured to:
determine that the brake temperature and the ambient temperature are similar in response to determining that a difference between the brake temperature and the ambient temperature is less than a threshold temperature difference, and
determine the compensated resistance of the coil and the health status of the LRU in response to determining that the brake temperature and the ambient temperature are similar.

13. The system of claim 11, wherein the BCU is further configured to determine the compensated resistance of the coil based on at least one of the brake temperature alone, the ambient temperature alone, or an average of the brake temperature and the ambient temperature.

14. The system of claim 11, wherein the BCU is further configured to:
determine a resistance difference between the compensated resistance of the coil and the nominal resistance of the coil, and
determine that the LRU is to be replaced within a predetermined amount of time in response to determining that the resistance difference is greater than a resistance threshold value.

15. The system of claim 11, wherein the LRU includes a wheel speed sensor having a rotating magnet such that the coil remains stationary relative to the rotating magnet and outputs an analog current (AC) waveform based on an angular speed of the rotating magnet, and the power source is a separate component from the wheel speed sensor.

16. The system of claim 11, wherein the LRU includes a valve having a poppet such that the coil actuates the poppet to close or open the valve in response to receiving the DC voltage.

17. The system of claim 11, wherein the BCU further includes a BCU temperature sensor configured to detect a BCU temperature, and the BCU is further configured to determine the health status of the LRU in response to determining that the BCU temperature is greater than a BCU temperature threshold.

18. A method for determining a health status of a line replaceable unit (LRU) having a coil, comprising:
receiving, at a BCU, a temperature;
receiving, at the BCU, a direct current (DC) voltage that is applied to the coil of the LRU;
receiving, at the BCU, a detected current corresponding to an amount of current flowing through the coil;
determining, by the BCU, a calculated resistance of the coil based on the detected current and the DC voltage;
determining, by the BCU, a compensated resistance of the coil based on the temperature and the calculated resistance of the coil; and
determining, by the BCU, the health status of the LRU by comparing the compensated resistance of the coil to a nominal resistance of the coil.

19. The method of claim 18, further comprising:
determining, by the BCU, a resistance difference between the compensated resistance of the coil and the nominal resistance of the coil; and
determining, by the BCU, that the LRU is to be replaced within a predetermined amount of time in response to determining that the resistance difference is greater than a resistance threshold value.

20. The method of claim 18, further comprising controlling, by the BCU, an output device to output data corresponding to the health status of the LRU in response to determining the health status of the LRU.

* * * * *